W. Ballard,
Lifting Jack,
Nº 4,627. Patented July 7, 1846.
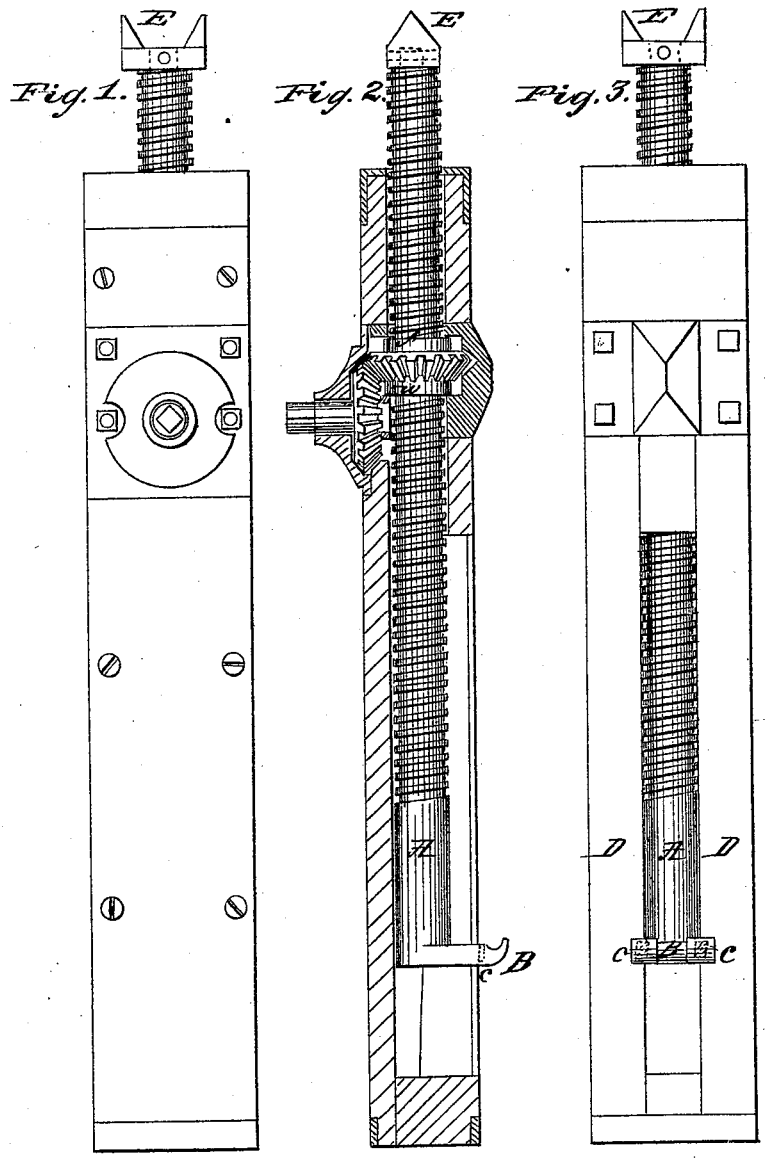

UNITED STATES PATENT OFFICE.

WILLIAM BALLARD, OF NEW YORK, N. Y.

JACK-SCREW.

Specification of Letters Patent No. 4,627, dated July 7, 1846.

*To all whom it may concern:*

Be it known that I, WILLIAM BALLARD, of the city and State of New York, have invented new and useful Improvements in the Machine called a "Jack" or "Jack-Screw," giving it greater durability, rendering it less liable to break, causing it to operate with greater facility, regularity, and convenience and to overcome greater resistance or to move greater weights by the application of the same or a less amount of power than was required before my improvements; and I do hereby declare that the following is a full and accurate description of my said improvements, reference being had to the annexed drawings, making a part of this specification, of which—

Figure 1 is a front elevation. Fig. 2, a cut section, and Fig. 3, a back or rear elevation.

Two metallic side bars D D are screwed or riveted upon the back of the wooden stock, upon either side of the groove containing the screw, against which bars the weight or burden to be raised may rest and upon which the claw B may slide in ascending and descending with the screw. The claw B is to be made solid upon the screw rod A instead of being attached thereto by means of a pin as heretofore, and the head or top piece E is to be riveted upon the upper end of the screw, instead of being made solid thereon as heretofore. By this arrangement the head E can be removed and the screw inserted into the female screw *f* from below. The claw B is to extend out from the screw to any desirable distance (for ordinary purposes, say two or three inches) from the side bars D. D. and is to be made with two shoulders, one on either side fitting neatly upon the side bars upon which the claw, by means of these shoulders, is to slide, as it ascends and descends with the screw. The shoulders of the screw claw, where they come in contact with the side bars are to be faced with steel pieces dovetailed therein and represented by C C.

A steel ring *w*, is let into the lower end of the female screw, where it rests upon the plate attached to the stock, to act as a washer for the purpose of preventing friction in this joint and causing the screw to operate more easily.

In the jack screw heretofore known and used the claw was riveted upon the lower end of the screw rod, and extended out therefrom through the opening in the wooden stock without any bearing, on any means of holding it steady, and supporting it except its attachment to the screw rod; the consequence was that when placed under a weight and put into operation, the claw would act upon the weight or resistance, with so long a purchase, as to be very liable to break, and having no bearing upon the sides, would swing from side to side, twisting it in different positions; the weight at the same time having no bearing to steady it except the wooden stock. The difficulty in the use of the jack screw from these causes and chiefly from the long purchase of the claw with no support or guide, was so great as to render it of scarcely any practical utility, but with the present improvements the claw being solid upon the screw rod and the shoulders thereof bearing and sliding upon the side bars, the purchase is shortened, the screw, claw and weight are caused to ascend and descend steadily and the whole machine to operate with so much more utility safety and effect, as to remove the previous objections, and to give it an entirely new character.

What I claim as my invention and desire to secure by Letters Patent, is—

The combination of the claw, screw, rod and side bars, as above described, and for the purpose herein set forth.

WILL. BALLARD.

Witnesses:
 DANIEL BALLARD,
 LEWIS SILBENAD.